(12) United States Patent
Wang et al.

(10) Patent No.: US 12,461,041 B2
(45) Date of Patent: Nov. 4, 2025

(54) MEASUREMENT OF THICK FILMS AND HIGH ASPECT RATIO STRUCTURES

(71) Applicant: KLA Corporation, Milpitas, CA (US)

(72) Inventors: David Y. Wang, Santa Clara, CA (US); Shankar Krishnan, Cupertino, CA (US)

(73) Assignee: KLA Corporation, Milpitas, CA (US)

( * ) Notice: Subject to any disclaimer, the term of this patent is extended or adjusted under 35 U.S.C. 154(b) by 279 days.

(21) Appl. No.: 18/185,100

(22) Filed: Mar. 16, 2023

(65) Prior Publication Data

US 2023/0341337 A1    Oct. 26, 2023

Related U.S. Application Data

(60) Provisional application No. 63/332,710, filed on Apr. 20, 2022.

(51) Int. Cl.
*G01N 21/95* (2006.01)

(52) U.S. Cl.
CPC . *G01N 21/9501* (2013.01); *G01N 2021/9511* (2013.01)

(58) Field of Classification Search
CPC ....... G01N 21/9501; G01N 2021/9511; G01N 2021/8438; G01B 2210/56; G01B 11/0641; G03F 7/706851; G03F 7/706849; H01L 22/12

See application file for complete search history.

(56) References Cited

U.S. PATENT DOCUMENTS

| | | | |
|---|---|---|---|
| 5,608,526 A | 3/1997 | Piwonka-Corle et al. | |
| 5,859,424 A | 1/1999 | Norton et al. | |
| 6,005,965 A * | 12/1999 | Tsuda | G01N 21/88 250/559.08 |

(Continued)

FOREIGN PATENT DOCUMENTS

WO    03106916 A2    12/2003

OTHER PUBLICATIONS

WIPO, International Search Report for International Application No. PCT/US2023/018917, Jul. 25, 2023.

(Continued)

*Primary Examiner* — Hung V Nguyen
(74) *Attorney, Agent, or Firm* — Hodgson Russ LLP

(57) ABSTRACT

The system includes a light source configured to emit light along an illumination path; a projection optical assembly disposed in the illumination path; a target disposed in the illumination path and configured to reflect the light along a collection path; a collection optical assembly disposed in the collection path; a detector disposed in the collection path and configured to detect the light reflected from the target and generate an output signal based on the detected light; and a processor in electronic communication with the detector and configured to generate a measurement of the target based on the output signal. The projection optical assembly defines a first numerical aperture at the target and the collection optical assembly defines a second numerical aperture at the target, and the first numerical aperture is slightly larger than the second numerical aperture for measurements of thick films and high aspect ratio structures.

20 Claims, 4 Drawing Sheets

(56) References Cited

U.S. PATENT DOCUMENTS

| | | | |
|---|---|---|---|
| 6,078,380 A * | 6/2000 | Taniguchi | G03B 27/68 |
| | | | 356/400 |
| 6,429,943 B1 | 8/2002 | Opsal et al. | |
| 7,053,991 B2 * | 5/2006 | Sandusky | G01N 21/47 |
| | | | 356/369 |
| 7,478,019 B2 | 1/2009 | Zangooie et al. | |
| 7,933,026 B2 | 4/2011 | Opsal et al. | |
| 9,291,554 B2 | 3/2016 | Kuznetsov et al. | |
| 9,915,522 B1 | 3/2018 | Jiang et al. | |
| 10,769,320 B2 | 9/2020 | Kuznetsov et al. | |
| 11,181,825 B2 * | 11/2021 | Hashimoto | G03F 7/70133 |
| 2004/0246481 A1 | 12/2004 | Sandusky | |
| 2008/0036988 A1 | 2/2008 | Teunissen et al. | |
| 2013/0211760 A1 | 8/2013 | Chu et al. | |
| 2018/0180406 A1 | 6/2018 | Sapiens et al. | |

OTHER PUBLICATIONS

WIPO, Written Opinion of the International Searching Authority for International Application No. PCT/US2023/018917, Jul. 25, 2023.

* cited by examiner

MEASUREMENT OF THICK FILMS AND HIGH ASPECT RATIO STRUCTURES

CROSS-REFERENCE TO RELATED APPLICATIONS

This application claims priority to the provisional patent application filed Apr. 20, 2022 and assigned U.S. App. No. 63/332,710, the disclosure of which is hereby incorporated by reference.

FIELD OF THE DISCLOSURE

This disclosure relates to semiconductor metrology.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Metrology processes are used at various steps during semiconductor manufacturing to monitor and control the process. Metrology processes are different than inspection processes in that, unlike inspection processes in which defects are detected on wafers, metrology processes are used to measure one or more characteristics of the wafers that cannot be determined using existing inspection tools. Metrology processes can be used to measure one or more characteristics of wafers such that the performance of a process can be determined from the one or more characteristics. For example, metrology processes can measure a dimension (e.g., line width, thickness, etc.) of features formed on the wafers during the process. In addition, if the one or more characteristics of the wafers are unacceptable (e.g., out of a predetermined range for the characteristic(s)), the measurements of the one or more characteristics of the wafers may be used to alter one or more parameters of the process such that additional wafers manufactured by the process have acceptable characteristic(s).

Spectroscopic ellipsometry (SE) and Spectroscopic reflectometry (SR) are two techniques in film and critical dimension (CD) metrology. In flash memory production, there is a growing demand for SE and SR metrology of thick films, high aspect ratio (HAR) structures, and large pitch targets. Measurement sensitivity is a function of many parameters including fringe contrasts. Fringe contrast is typically increased as the signal on the detector is averaged over smaller angles. Thick stacks are more susceptible to angle averaging because of the large optical path. When signals from different angles are mixed, sensitivity to target features is reduced, and an SE having large collection numerical aperture (NA) off the target will be unable to measure thick films and HAR structures. An SE having lower NA off the target may be desired for measurements of thick films and HAR structures. Rigorous-coupled wave analysis (RCWA) models used in SE systems typically also require a spot size covering 5 to 7 pitches. However existing SE systems utilize high NA projection optics, which create a small spot at the wafer and are not optimized for thick films and HAR structures. Consequently, photon flux is lost at the small NA collection optics, which reduces spectral resolution and fidelity and limits measurements to structures having less than 200 layers.

Therefore, what is needed is a SE system that is optimized for light throughput for measurements of thick films, HAR structures, and large pitch layers.

BRIEF SUMMARY OF THE DISCLOSURE

An embodiment of the present disclosure provides a system comprising: a light source configured to emit light along an illumination path; a projection optical assembly disposed in the illumination path; a target disposed in the illumination path, wherein the target is configured to reflect the light along a collection path; a collection optical assembly disposed in the collection path; a detector disposed in the collection path, wherein the detector is configured to detect the light reflected from the target and generate an output signal based on the detected light; and a processor in electronic communication with the detector, wherein the processor is configured to generate a measurement of the target based on the output signal. The projection optical assembly defines a first numerical aperture at the target and the collection optical assembly defines a second numerical aperture at the target, and the first numerical aperture is slightly larger than the second numerical aperture.

Another embodiment of the present disclosure provides a method comprising: emitting light from a light source along an illumination path; focusing the light with a projection optical assembly disposed in the illumination path; reflecting the light focused by the projection optical assembly from the illumination path to a collection path with a target; collecting the light reflected by the target with a collection optical assembly disposed in the collection path; detecting the light collected by the collection optical assembly with a detector disposed in the collection path to generate an output signal; and generating a measurement of the target with a processor in electronic communication with the detector based on the output signal. The projection optical assembly defines a first numerical aperture at the target and the collection optical assembly defines a second numerical aperture at the target, and the first numerical aperture is larger than the second numerical aperture.

In some embodiments, the light emitted by the light source has a wavelength from 150 to 2500 nm.

In some embodiments, the first numerical aperture is from 0.01 to 0.1 at the target. In some embodiments, the first numerical aperture is from 0.02 to 0.05 at the target.

In some embodiments, the projection optical assembly is disposed in a first plane and the collection optical assembly is disposed in a second plane, and the first plane is perpendicular to the second plane. In some embodiments, a magnification of the projection optical assembly is from 0.1× to 10×.

In some embodiments, the projection optical assembly comprises a first pair of mirrors configured to reflect the light in the illumination path so as to define the first numerical aperture at the target, and the collection optical assembly comprises a second pair of mirrors configured to reflect the light in the collection path so as to define the second numerical aperture at the target.

In some embodiments, the system is configured to generate measurements of the target at three or more angles of incidence (AOI).

In some embodiments, the target is a high aspect ratio structure. In some embodiments, the target is a substrate comprising 200 to 500 layers.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process, step, and electronic changes may be made without departing from the scope of the disclosure. Accordingly, the scope of the disclosure is defined only by reference to the appended claims.

Figure 1:
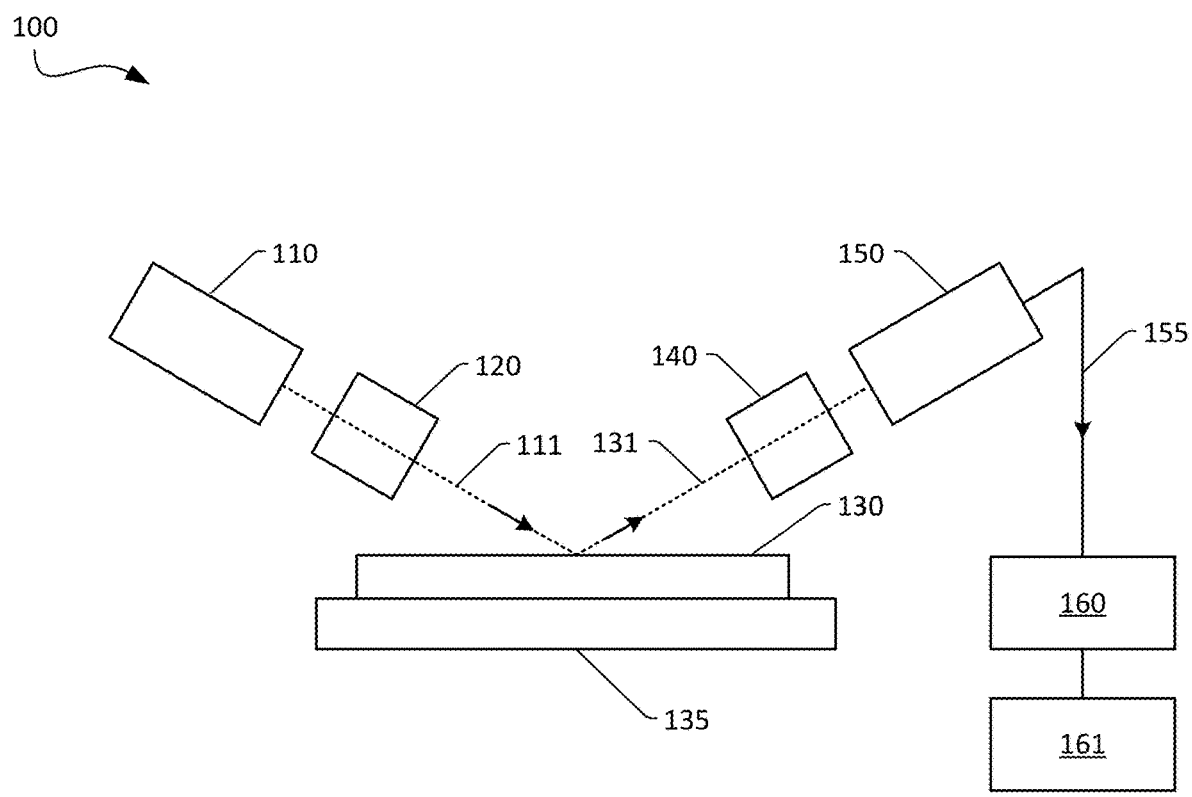
FIG. 1 is a block diagram of a system according to an embodiment of the present disclosure.

An embodiment of the present disclosure provides a system 100. The system 100 may be a metrology tool. In an instance, the system 100 in FIG. 1 may include an illumination system (e.g., light source 110), which illuminates a sample (e.g., target 130); a detector 150 which captures relevant information provided by the illumination system's interaction (or lack thereof) with the target 130, device, or feature on the sample; and a processor 160 which analyzes the information collected using one or more algorithms. The light source 110 may direct light at the sample at an angle, and light can be reflected from the sample to the detector 150 at a different angle. The light may be directed at different angles of incidence (AOI) sequentially or simultaneously by multiple light sources 110. For example, the system 100 may collect information at three or more AOI.

The light source 110 may be configured to emit light along an illumination path 111. The light emitted by the light source 110 may have a wavelength of 150 to 2500 nm. The light source 110 may be a laser, lamp, super continuum laser, globar, or laser sustained plasma (LSP) source. In some embodiments, the system 100 may be a broad-band metrology tool, and the light source 110 may include a broad-band LSP source. The light source 110 may produce a beam of light with other sources or may use other techniques to measure a surface of a sample. The light source 110 may contain optics for conditioning the light and/or focusing the light. The light source 110 may further comprise a polarizer that may be fixed or rotating. The light source 110 may further comprise a compensator that may be fixed or rotating.

The system 100 may further comprise a projection optical assembly 120. The projection optical assembly may be disposed in the illumination path 111. The projection optical assembly 120 may define a first numerical aperture from 0.01 to 0.1 at the target 130. In some embodiments, the first numerical aperture may be from 0.02 to 0.05 at the target 130. A magnification of the projection optical assembly 120 may be from 0.1× to 10×. In some embodiments, the magnification of the projection optical assembly 120 may be from 1.5× to 2×. For example, the magnification may be 1×.

Figure 2:
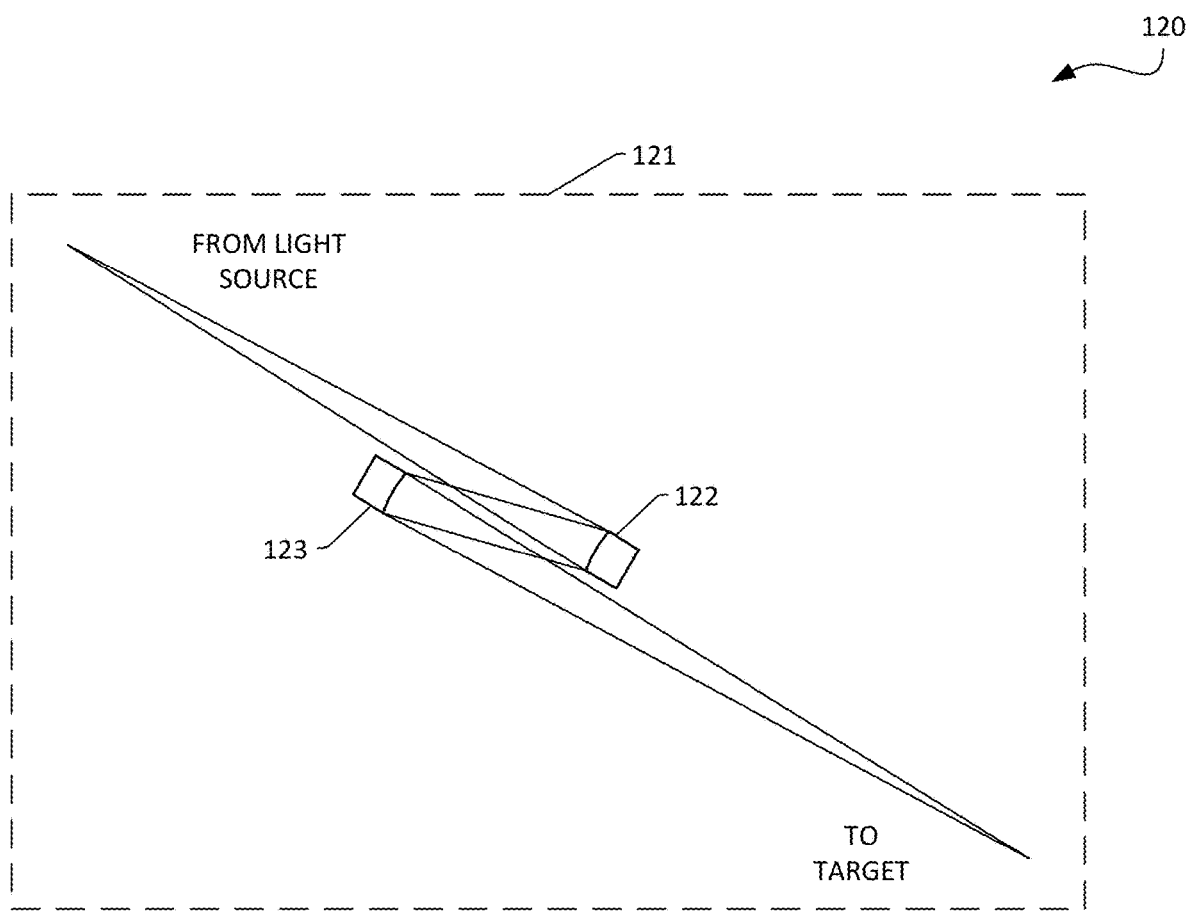
FIG. 2 is a block diagram of a projection optical assembly of the system of FIG. 1.

The projection optical assembly 120 may include one or more optical elements having reflective optical power. Such optical elements may have one or more surfaces having reflective power and may be of various shapes (e.g., spherical, aspherical, etc.). For example, the optical elements may be mirrors having a flat, convex, or concave shape. A combination of different optical elements may be selected based on the magnification, numerical aperture, and geometric requirements. In one example shown in FIG. 2, the projection optical assembly 120 may comprise a first pair of mirrors, comprising a first projection mirror 122 and a second projection mirror 123. The first projection mirror 122 and the second projection mirror 123 may be disposed in a first plane 121. The first projection mirror 122 and the second projection mirror 123 may be configured to reflect the light in the illumination path 111 so as to define the first numerical aperture relative to the target 130. For example, the first projection mirror 122 may be a convex mirror, and the second projection mirror 123 may be a concave mirror. In other examples, the curvature of the mirrors may be reversed (i.e., the first projection mirror 122 may be a concave mirror, and the second projection mirror 123 may be a convex mirror). When the light is reflected from the first projection mirror 122 and the second projection mirror 123 and focused onto the target 130, the first numerical aperture may be from 0.01 to 0.1 at target 130. As such, the first projection mirror 122 and the second projection mirror 123 may be arranged in the first plane 121 to achieve the first numerical aperture from 0.01 to 0.1 at target 130.

The projection optical assembly 120 may further comprise one or more pupils, field stops, lenses, mirrors, filters, apodizers, or beam conditioning optics for conditioning the light along the illumination path 111 and/or focusing the light onto the target 130.

Referring back to FIG. 1, the target 130 may be disposed in the illumination path 111. The target 130 may be configured to reflect the light focused by the projection optical assembly 111 along a collection path 131. The target 130 may include a high aspect ratio structure on a substrate. For example, the target 130 may be flash memory on a semiconductor wafer. The target 130 may be a substrate comprising 200 to 500 layers. The target 130 may be disposed on a stage 135.

The system 100 may further comprise a collection optical assembly 140. The projection optical assembly 140 may be disposed in the collection path 131. The collection optical assembly 140 may define a second numerical aperture from 0.01 to 0.1 at target 130. In some embodiments, the second numerical aperture may be from 0.02 to 0.05 at target 130. A magnification of the collection optical assembly 140 may be from 0.1× to 10×. In some embodiments, the magnification of the collection optical assembly 140 may be from 1.5× to 2×. For example, the magnification may be 1×.

In some embodiments, the first numerical aperture may be equal to or slightly larger than the second numerical aperture. For example, the first numerical aperture may be 0.01 greater than the second numerical aperture. When the projection optical assembly 120 and the collection optical assembly are arranged in this manner, photon flux may be preserved between the light that illuminates the target and the light reflected from the target, which can improve spectral resolution and fidelity.

Figure 3:
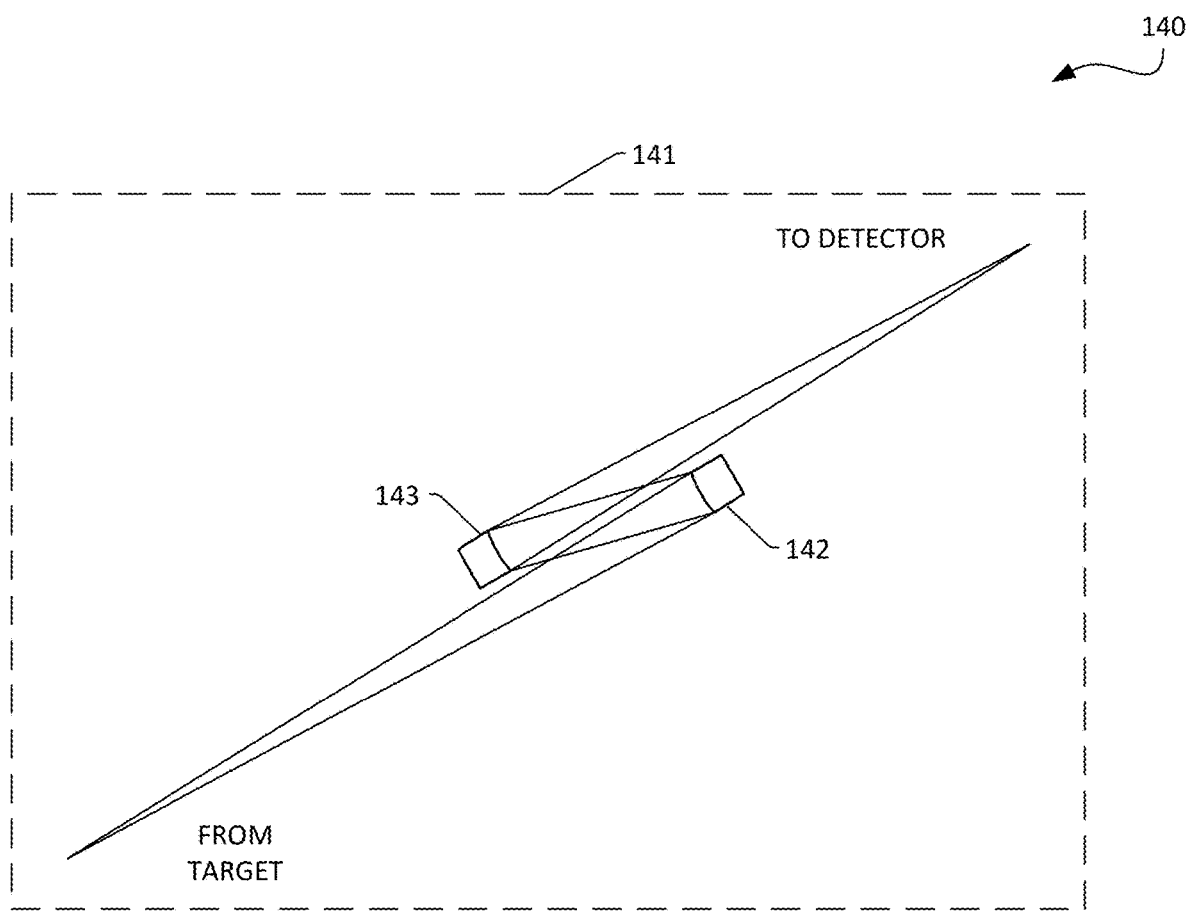
FIG. 3 is a block diagram of a collection optical assembly of the system of FIG. 1.

The collection optical assembly 140 may include one or more optical elements having reflective optical power. Such optical elements may have one or more surfaces having reflective power and may be of various shapes (e.g., spherical, aspherical, etc.). For example, the optical elements may be mirrors having a flat, convex, or concave shape. A combination of different optical elements may be selected based on the magnification, numerical aperture, and geometric requirements. In one example shown in FIG. 3, the collection optical assembly 140 may comprise a second pair of mirrors, comprising a first collection mirror 142 and a second collection mirror 143. The first collection mirror 142 and the second collection mirror may be disposed in a second plane 141. The first collection mirror 142 and the second collection mirror 143 may be configured to reflect the light in the collection path 131 so as to define the second numerical aperture relative to the target 130. For example, the first collection mirror 142 may be a convex mirror, and the second collection mirror 143 may be a concave mirror. In other examples, the curvature of the mirrors may be reversed (i.e., the first collection mirror 142 may be a concave mirror, and the second collection mirror 143 may be a convex mirror). When the light is reflected between the first collection mirror 142 and the second collection mirror 143 and collected onto the detector 150, the second numerical aperture may be from 0.01 to 0.1 at the target 130. As such, the first collection mirror 142 and the second collection mirror 143 may be arranged in the second plane 141 to achieve the second numerical aperture from 0.01 to 0.1 at the target 130.

In some embodiments, the first plane 121 may be perpendicular to the second plane 141. When the first plane 121 and the second plane 141 are arranged in this manner, net phase error between the projection optical assembly 120 and the collection optical assembly 140 may be minimized.

The collection optical assembly 140 may further comprise one or more pupils, field stops, or a spectrometer for conditioning the light along the collection path 131 onto the detector. The collection optical assembly 140 may further comprise a series of polarizers (rotating or fixed), analyzers (rotating or fixed), compensators (rotating or fixed), detectors, spectrometers, cameras, lenses, mirrors, beam splitters, apertures, filters, and/or collimators. The collection optical assembly 140 may include: rotating compensator, rotating compensator (RCRC); rotating polarizer, rotating compensator (RPRC); rapid photoreflectance (RPR) spectroscopy; resonant-cavity enhanced (RCE) spectroscopy; and/or Mueller matrix elements. The collection optical assembly 140 may be further configured to collect light at one or more AOIs, sequentially or simultaneously (i.e., in parallel). For example, the collection optical assembly 140 may be configured to collect light at three or more AOIs.

Referring back to FIG. 1, the detector 150 may be disposed in the collection path 131. The detector 150 may be configured to detect the light collected by the collection optical assembly 140. The detector 150 may be further configured to generate an output signal 155 based on the detected light.

The processor 160 can communicate with the detector 150 or other components of the system 100. The processor 160 may be implemented in practice by any combination of hardware, software, and firmware. Also, its functions as described herein may be performed by one unit, or divided up among different components, each of which may be implemented in turn by any combination of hardware, software, and firmware. Program code or instructions for the processor 160 to implement various methods and functions may be stored in controller readable storage media, such as a memory in an electronic data storage unit 161 in electronic communication with the processor 160, within the processor 160, external to the processor 160, or combinations thereof.

The processor 160 may be coupled to the components of the system 100 in any suitable manner (e.g., via one or more transmission media, which may include wired and/or wireless transmission media) such that the processor 160 can receive the output generated by the system 100, such as output from the detector 150. The processor 160 may be configured to perform a number of functions using the output. For instance, the processor 160 may be configured to generate a measurement of the target 130 based on the output signal 155. The measurement may comprise one or more of critical dimension (CD), single-wire aggregation (SWA), shape, stress, composition, films, bandgap, electrical properties, focus/dose, overlay, generating process parameters (e.g., resist state, partial pressure, temperature, focusing model), and/or any combination thereof. The processor 160 may be configured to send the output to an electronic data storage unit 161 or another storage medium without reviewing the output. The processor 160 may be further configured as described herein.

The processor 160, other system(s), or other subsystem(s) described herein may take various forms, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool. For example, the processor 160 may include a microprocessor, a microcontroller, or other devices.

The processor 160 may be in electronic communication with the detector 150 or other components of the system 100. The processor 160 may be configured according to any of the embodiments described herein. The processor 160 also may be configured to perform other functions or additional steps using the output of the detector 150 or using images, measurements, or data from other sources.

The system 100 can provide information about the target 130 or can provide information used to form images of the target 130. In particular, the system 100 can be configured to provide one or more of rotating polarizer data, rotating compensator spectroscopic ellipsometry data; full Mueller matrix components data; rotating polarizer spectroscopic ellipsometry data; reflectometry data; laser-driven spectroscopic reflectometry data; or X-ray data. In an instance, the system 100 provides spectroscopic ellipsometry using a broadband light source, the detector 150 measures how the light source interacts with the target, and processing algorithms that extract the relevant parameters of the target. In another instance, the light source 110 may be a LSP source, which can provide high intensities and increase the signal-to-noise ratio at the detector, as opposed to a Xe lamp. To enhance target signatures, the system 100 may use $N_2$ or Ar gas purge to extend the wavelength range to 170 nm or below.

The system 100 can comprise one or more hardware configurations which may be used in conjunction with certain embodiments of this invention to, for example, measure the various aforementioned semiconductor structural and material characteristics. Examples of such hardware configurations include, but are not limited to, a spectroscopic ellipsometer (SE), an SE with multiple angles of illumination, an SE measuring Mueller matrix elements (e.g. using rotating compensator(s)), a single-wavelength ellipsometer, a beam profile ellipsometer (angle-resolved ellipsometer), a beam profile reflectometer (angle-resolved reflectometer), a broadband reflective spectrometer (spectroscopic reflectometer), a single-wavelength reflectometer, an angle-resolved reflectometer, an imaging system, or a scatterometer (e.g. speckle analyzer).

The hardware configurations can be separated into discrete operational systems. One or more hardware configurations can be combined into a single tool. U.S. Pat. No. 7,933,026, which is hereby incorporated by reference in its entirety, provides an example. There are typically numerous optical elements in such systems, including certain lenses, collimators, mirrors, quarter-wave plates, polarizers, detectors, cameras, apertures, and/or light sources. The wavelengths for optical systems can vary from about 120 nm to 3 microns. For non-ellipsometer systems, signals collected can be polarization-resolved or unpolarized. Multiple metrology tools also can be used for measurements on a single or multiple metrology targets, such as described in U.S. Pat. No. 7,478,019, which is incorporated by reference in its entirety.

The illumination system of the certain hardware configurations can include one or more light sources. The light source may generate light having only one wavelength (i.e., monochromatic light), light having a number of discrete wavelengths (i.e., polychromatic light), light having multiple wavelengths (i.e., broadband light) and/or light the sweeps through wavelengths, either continuously or hopping between wavelengths (e.g., using tunable sources or swept source). Examples of suitable light sources include a white light source, an ultraviolet (UV) laser, an arc lamp or an electrode-less lamp, a laser sustained plasma (LSP) source, a supercontinuum source (such as a broadband laser source), or shorter-wavelength sources such as x-ray sources, extreme UV sources, or some combination thereof. The light source may also be configured to provide light having sufficient brightness, which in some cases may be a brightness greater than about 1 W/(nm cm² Sr). The system 100 also can include a fast feedback to the light source for stabilizing its power and wavelength. Output of the light source can be delivered via free-space propagation, or in some cases delivered via optical fiber or light guide of any type.

The system 100 can be designed to make many different types of measurements related to semiconductor manufacturing. For example, the system 100 can measure characteristics of one or more targets, such as critical dimensions, overlay, sidewall angles, film thicknesses, process-related parameters (e.g., focus and/or dose). The targets can include certain regions of interest that are periodic in nature, such as for example gratings in a memory die. Targets can include multiple layers (or films) whose thicknesses can be measured by the metrology tool. Targets can include target designs placed (or already existing) on the semiconductor wafer for use, such as with alignment and/or overlay registration operations. Certain targets can be located at various places on the semiconductor wafer. For example, targets can be located within the scribe lines (e.g., between dies) and/or located in the die itself. In certain embodiments, multiple targets are measured (at the same time or at differing times) by the same or multiple metrology tools. The data from such measurements may be combined. Data from the system 100 can be used in the semiconductor manufacturing process for example to feed-forward, feed-backward and/or feed-sideways corrections to the process (e.g., lithography or etch).

As semiconductor device pattern dimensions continue to shrink, smaller metrology targets are often required. Furthermore, the measurement accuracy and matching to actual device characteristics can increase the need for device-like targets as well as in-die and even on-device measurements. For example, focused beam ellipsometry based on primarily reflective optics can be used. Apodizers can be used to mitigate the effects of optical diffraction causing the spread of the illumination spot beyond the size defined by geometric optics. High-numerical-aperture tools with simultaneous multiple angle-of-incidence illumination can be used to achieve small-target capability.

Other measurement examples can include measuring the composition of one or more layers of the semiconductor stack, measuring certain defects on (or within) the wafer, or measuring the amount of photolithographic radiation exposed to the wafer. In some cases, the system 100 and algorithm may be configured for measuring non-periodic targets.

In addition, there are typically numerous optical elements in such systems, including certain lenses, collimators, mirrors, quarter-wave plates, polarizers, detectors, cameras, apertures, and/or light sources. The wavelengths for optical systems can vary from about 120 nm to 3 microns. For non-ellipsometer systems, signals collected can be polarization-resolved or unpolarized. Multiple metrology heads can be integrated on the same tool. However, in many cases, multiple metrology tools are used for measurements on a single or multiple metrology targets.

Measurement of parameters of interest usually involves multiple algorithms. For example, optical interaction of the incident beam with the sample is modeled using an electromagnetic (EM) solver and uses such algorithms as rigorous coupled wave analysis (RCWA), finite element modeling (FEM), method of moments, surface integral method, volume integral method, finite-difference time domain (FDTD), and others. The target of interest is usually modeled (parametrized) using a geometric engine a process modeling engine, or a combination of both. A geometric engine is implemented, for example, in the AcuShape software product from KLA Corporation.

Collected data can be analyzed by a number of data fitting and optimization techniques an technologies including libraries, fast-reduced-order models, regression, machine-learning algorithms, principal component analysis (PCA), independent component analysis (ICA), local-linear embedding (LLE), sparse representation such as Fourier or wavelet transform, a Kalman filter, algorithms to promote matching from same or different tool types, or others. Collected data can also be analyzed by algorithms that do not include modeling, optimization and/or fitting.

Computational algorithms are usually optimized for metrology applications with one or more approaches being used such as design and implementation of computational hardware, parallelization, distribution of computation, load-balancing, multi-service support, or dynamic load optimization. Different implementations of algorithms can be done in firmware, software, FPGA, programmable optics components, etc.

The data analysis and fitting steps can have one or more objectives. Critical dimension, sidewall angle, shape, stress, composition, films, bandgap, electrical properties, focus/dose, overlay, generating process parameters (e.g., resist state, partial pressure, temperature, focusing model), and/or any combination thereof can be measured or otherwise determined. Metrology systems can be modeled or designed. Metrology targets also can be modelled, designed, and/or optimized.

Embodiments of the present disclosure address the field of semiconductor metrology and are not limited to the hardware, algorithm/software implementations and architectures, and use cases summarized above.

With the system 100 of the present disclosure, the small NA of the projection optical assembly 120 and corresponding small NA of the collection optical assembly 130 may preserve photon flux in the light reflected from the target 130, which can improve spectral resolution and fidelity of measurements. Accordingly, the system 100 may be suitable for measuring thick films, HAR structures, and substrates having large pitch layers.

Figure 4:
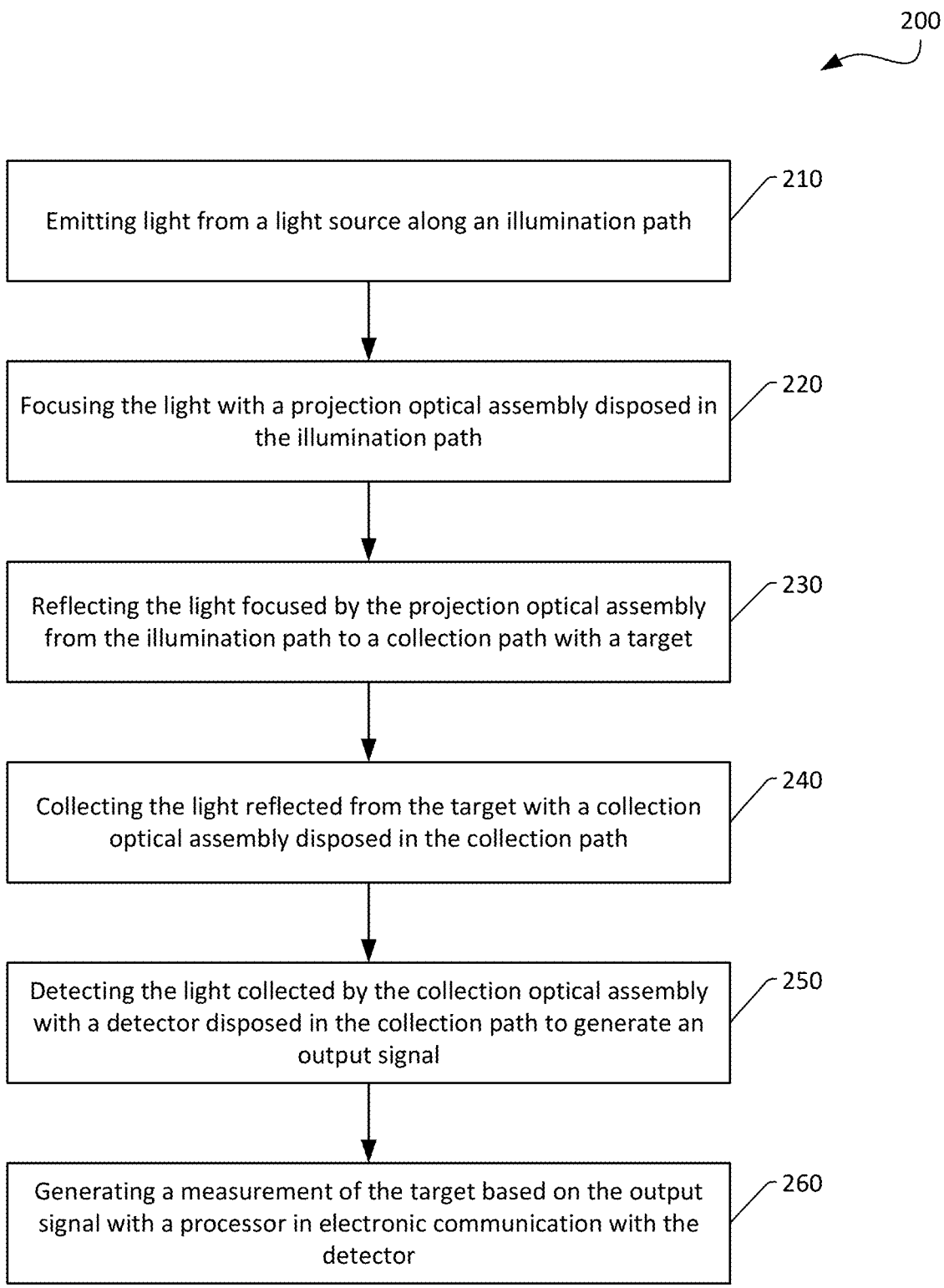
FIG. 4 is a flowchart of a method according to an embodiment of the present disclosure.

An embodiment of the present disclosure provides a method 200. The method 200 may be applied to a metrology tool, such as the system 100 described above. As shown in FIG. 4, the method 200 may comprise the following steps.

At step 210, light is emitted from a light source along an illumination path. The light emitted by the light source may have a wavelength of 150 to 2500 nm. The light source may be a laser, lamp, globar, or LSP source. In some embodiments, the method 200 may be applied to a broad-band plasma tool, and the light source may include a broad-band plasma source. The light source may produce a beam of light with other sources or may use other techniques to measure a surface of a sample. The light may be directed at different angles of incidence (AOI) sequentially or simultaneously by multiple light sources. For example, information may be collected at three or more AOI.

At step 220, the light is focused with a projection optical assembly disposed in the illumination path. The projection optical assembly may define a first numerical aperture from 0.01 to 0.1 at the target. In some embodiments, the first numerical aperture may be from 0.02 to 0.05 at the target. A magnification of the projection optical assembly may be from 0.1× to 10×. In some embodiments, the magnification of the projection optical assembly may be from 1.5× to 2×. For example, the magnification may be 1×.

At step 230, the light focused by the projection optical assembly is reflected from the illumination path to a collection path with a target. The target may be disposed in the illumination path on a stage. The target may be a high aspect ratio structure. For example, the target may be flash memory. The target 130 may be a substrate comprising 200 to 500 layers.

At step 240, the light reflected from the target is collected with a collection optical assembly disposed in the collection path. The collection optical assembly may define a second numerical aperture of 0.01 to 0.1 at the target. In some embodiments, the second numerical aperture may be 0.02 to 0.05 at the target. A magnification of the collection optical assembly may be from 0.1× to 10×. In some embodiments, the magnification of the collection optical assembly may be from 1.5× to 2×. For example, the magnification may be 1×. The first numerical aperture may be equal to or slightly greater than the second numerical aperture. For example, the first numerical aperture may be 0.01 greater than the second numerical aperture.

At step 250, the light collected by the collection optical assembly is detected with a detector disposed in the collection path to generate an output signal.

At step 260, a measurement of the target is generated with a processor in electronic communication with the detector based on the output signal. The measurement may comprise one or more of critical dimension (CD), single-wire aggregation (SWA), shape, stress, composition, films, bandgap, electrical properties, focus/dose, overlay, generating process parameters (e.g., resist state, partial pressure, temperature, focusing model), and/or any combination thereof. The processor may be configured to send the output to an electronic data storage unit or another storage medium without reviewing the output.

With the method 200 of the present disclosure, the small NA of the projection optical assembly and corresponding small NA of the collection optical assembly may preserve photon flux in the light reflected from the target, which can improve spectral resolution and fidelity of measurements. Accordingly, the method 200 may be suitable for measuring thick films, HAR structures, and substrates having large pitch layers.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a light source configured to emit light along an illumination path;
   a projection optical assembly disposed in the illumination path;
   a target disposed in the illumination path, wherein the target is configured to reflect the light along a collection path;
   a collection optical assembly disposed in the collection path;
   a detector disposed in the collection path, wherein the detector is configured to detect the light reflected from the target and generate an output signal based on the detected light; and
   a processor in electronic communication with the detector, wherein the processor is configured to generate a measurement of the target based on the output signal;
   wherein the projection optical assembly defines a first numerical aperture at the target and the collection optical assembly defines a second numerical aperture at the target, and the first numerical aperture is slightly larger than the second numerical aperture.

2. The system of claim 1, wherein the light emitted by the light source has a wavelength from 150 to 2500 nm.

3. The system of claim 1, wherein the first numerical aperture is from 0.01 to 0.1 at the target.

4. The system of claim 3, wherein the first numerical aperture is from 0.02 to 0.05 at the target.

5. The system of claim 1, wherein the projection optical assembly is disposed in a first plane and the collection optical assembly is disposed in a second plane, and the first plane is perpendicular to the second plane.

6. The system of claim 1, wherein a magnification of the projection optical assembly is from 0.1× to 10×.

7. The system of claim 1, wherein the projection optical assembly comprises a first pair of mirrors configured to reflect the light in the illumination path so as to define the first numerical aperture at the target, and the collection optical assembly comprises a second pair of mirrors configured to reflect the light in the collection path so as to define the second numerical aperture at the target.

8. The system of claim 1, wherein the system is configured to generate measurements of the target at three or more angles of incidence (AOI).

9. The system of claim 1, wherein the target is a high aspect ratio structure.

10. The system of claim 1, wherein the target is a substrate comprising 200 to 500 layers.

11. A method comprising:
emitting light from a light source along an illumination path;
focusing the light with a projection optical assembly disposed in the illumination path;
reflecting the light focused by the projection optical assembly from the illumination path to a collection path with a target;
collecting the light reflected by the target with a collection optical assembly disposed in the collection path;
detecting the light collected by the collection optical assembly with a detector disposed in the collection path to generate an output signal; and
generating a measurement of the target with a processor in electronic communication with the detector based on the output signal;
wherein the projection optical assembly defines a first numerical aperture at the target and the collection optical assembly defines a second numerical aperture at the target, and the first numerical aperture is larger than the second numerical aperture.

12. The method of claim 11, wherein the light emitted by the light source has a wavelength from 150 to 2500 nm.

13. The method of claim 11, wherein the first numerical aperture is from 0.01 to 0.1 at the target.

14. The method of claim 13, wherein the first numerical aperture is from 0.02 to 0.05 at the target.

15. The method of claim 11, wherein the projection optical assembly is disposed in a first plane and the collection optical assembly is disposed in a second plane, and the first plane is perpendicular to the second plane.

16. The method of claim 11, wherein a magnification of the projection optical assembly is from 0.1× to 10×.

17. The method of claim 11, wherein the projection optical assembly comprises a first pair of mirrors configured to reflect the light in the illumination path so as to define the first numerical aperture at the target, and the collection optical assembly comprises a second pair of mirrors configured to reflect the light in the collection path so as to define the second numerical aperture at the target.

18. The method of claim 11, wherein the processor is configured to generate measurements of the target at three or more angles of incidence (AOI).

19. The method of claim 11, wherein the target is a high aspect ratio structure.

20. The method of claim 11, wherein the target is a substrate comprising 200 to 500 layers.

* * * * *